UNITED STATES PATENT OFFICE.

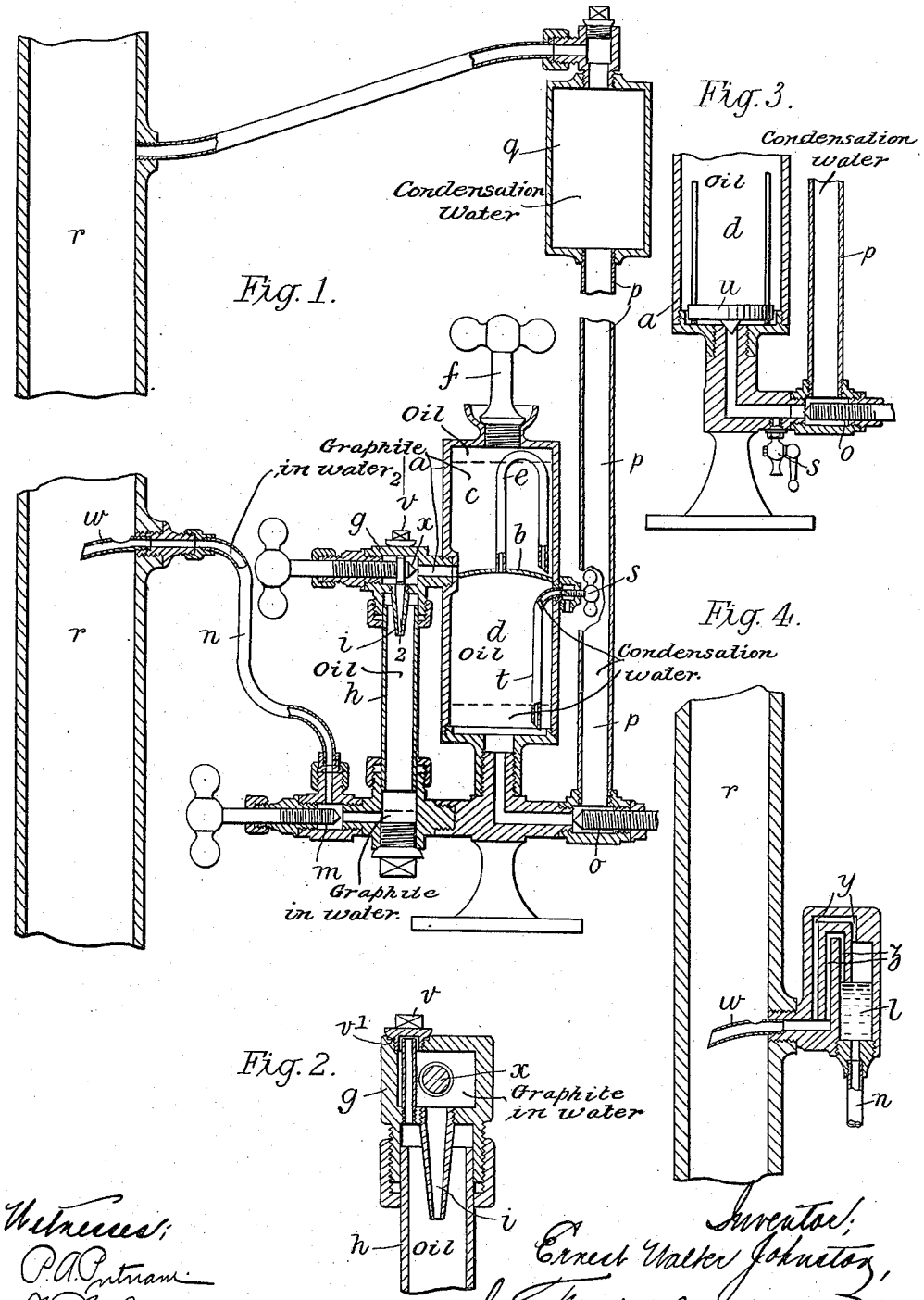

ERNEST WALTER JOHNSTON, OF BROMSGROVE, ENGLAND.

LUBRICATOR.

1,150,371.        Specification of Letters Patent.        Patented Aug. 17, 1915.

Application filed March 22, 1913. Serial No. 756,236.

*To all whom it may concern:*

Be it known that I, ERNEST WALTER JOHNSTON, a subject of the King of the United Kingdom of Great Britain and Ireland, residing at Sunnyside, Stourbridge Road, Bromsgrove, Worcester, England, have invented new and useful Improvements in and Relating to Lubricators, of which the following is a specification.

This invention relates to lubricators wherein the feed is effected through a sight tube and is more particularly for application to the lubrication of the internal parts of steam engines and other prime movers, air compressors and the like under pressure.

In a common form of steam engine sight-feed lubricator of the above type using oil as the lubricant a column of water in communication with the steam is in contact with the oil and displaces the same causing it either to rise through a water-filled tube or to fall through a steam-filled tube. Such an apparatus cannot be used with a graphitic (or like) aqueous fluid, or fluid which will readily mix with water owing to the fact that water or steam coming into contact with the lubricant would simply mix with or dilute the latter, and moreover would quickly render the feed invisible.

Now the present invention consists in certain improvements the main objects of which are to enable a lubricant such as deflocculated graphite, carried in water, or other lubricating mixture readily associated with water, to be employed, and to enable such a lubricant to be fed through a sight-feed device.

One improvement consists in the sight chamber containing non-aqueous liquid which is of a less specific gravity than that of the lubricant employed and which will not mix to any substantial extent therewith.

Another improvement consists in the combination with a sight chamber as aforesaid of means for injecting the lubricant into the same and means retaining the non-aqueous liquid to said chamber while allowing the lubricant to pass from the same.

Another improvement consists in the sight tube being formed as one arm of a vertical U tube and in the sight tube containing a non-aqueous liquid which is of a less specific gravity than the lubricant and which will not mix to any substantial extent therewith, the other arm of said U tube being filled with the lubricant. The non-aqueous liquid is thereby isolated and the lubricant is caused to fall downward through the same drop by drop from a suitable nozzle projecting into the upper end of the sight tube.

The invention also comprises other improvements consisting of the combinations of parts hereinafter claimed.

The non-aqueous liquid employed is preferably paraffin or a similar transparent oil or spirit.

Referring now to the accompanying drawings which illustrate one convenient form of apparatus comprising an example of a sight feed device constructed according to the invention:—Figure 1 is a sectional elevation showing the general arrangement of the apparatus; Fig. 2 is an enlarged detail section on the line 2, 2, of Fig. 1, Fig. 3 is a sectional view of a modified construction hereinafter referred to; and Fig. 4 is a further detail hereinafter referred to.

Referring to Fig. 1, a vessel $a$ is provided with a horizontal partition $b$ so as to form two chambers the upper of which ($c$) serves as the lubricant chamber and the lower ($d$) as the chamber for the paraffin or the like oil. The lower chamber $d$ will be hereinafter referred to as the intermediate chamber. An inverted U tube $e$ is arranged in the lubricant chamber $c$, one end of said tube passing through the partition $b$ and the other end extending down to the lower end of the lubricant chamber $c$. The upper end of the lubricant chamber is provided with a removable plug $f$ or other suitable apparatus for the insertion of fresh lubricant and the bottom end communicates with a valve chamber $g$ located at the upper end of the sight feed tube $h$. The valve chamber $g$ is provided with a needle or other suitable valve $x$ and has an outlet in the form of a conical or like nozzle $i$ dipping into the sight tube. The lower end of the sight tube is connected through an outflow valve $m$ with a vertical pipe $n$ normally filled with lubricant and leading to the steam pipe $r$, the engine valve chest or other part to be lubricated. It will be understood that the sight tube $h$, the pipe $n$ and the connecting passage at their lower ends form the vertical U-tube above referred to.

The lower end of the intermediate chamber $d$ is connected through a valve $o$ with a pipe $p$ leading to a condenser chamber $q$ situated at a suitable distance above the level of the other parts of the apparatus. This condenser chamber is also in communication with the steam pipe $r$.

In using the apparatus the intermediate chamber is filled with water by way of the condenser and valve $o$ is then closed. Valve $x$ being opened chamber $c$ is now filled with paraffin or like oil and the sight tube also becomes filled. Drain valve $s$ is now opened and the fluid in $c$ is automatically passed into $d$ displacing the water which drains off by way of the valve or cock $s$. Valve $s$ is now closed, and the chamber $c$ being now empty is filled with the desired lubricant and sealed.

In the normal operation the whole system is under pressure, and the additional pressure due to the head of water in the condenser chamber $q$ causes the lubricant to flow, regulated by the valve $x$, through the nozzle $i$ and drop by gravity through the paraffin in the sight tube $h$ and thence pass out of sight tube at the lower end mounting and filling the tube $n$. The lubricant passing out of the lubricant chamber $c$ is replaced by paraffin flowing in from the intermediate chamber $d$ through the inverted U tube $e$ and the flow from the latter chamber is in turn replaced by water of condensation from the condenser chamber. It will be understood that when the valve $x$ is opened a small amount, as it is under working conditions, there will be a constant flow of the lubricant past the valve and the non-aqueous liquid will not be able to rise from the sight tube into the chamber $c$. It will be readily understood that just before the lubricant chamber is emptied of lubricant the oil in $d$ will have passed from the intermediate chamber into the lubricant chamber and is followed by water of condensation which being heavier than the oil will remain at the bottom of the lubricant chamber and will begin to flow through the sight tube and will be seen passing through the same as clear water. The volumes of chambers $c$ and $d$ are not necessarily equal and in fact the intermediate chamber is preferably larger than the lubricant chamber. It may here be mentioned that an aqueous mixture of deflocculated graphite is practically black, a feature which renders its use particularly advantageous with sight feed lubricators as it can be very clearly seen even in a comparatively dim light.

When the clear water is seen in the sight feed tube the lubricant chamber is refilled and to do this the operation is as follows:—
The condenser valve $o$ and the nozzle valve $x$ to the sight tube are closed and then the drain cock $s$ and the lubricant filling plug $f$ are opened. The condensed water then siphons out of the intermediate chamber $d$ through the drain cock $s$ and dip pipe $t$ and the oil (together with any condensed water) is siphoned out of the lubricant chamber $c$ into the intermediate chamber. Although the cock $s$ is shown for convenience in the plane of the section it will be understood that it will be arranged to one side of the pipe $p$. The arrangement of the pipe $t$ and cock $s$ will prevent any loss of oil as the siphoning action will stop as soon as, or before, the oil level has reached that of the cock $s$, that is to say as soon as the oil has been returned to the chamber $d$. An alternative mode of preventing the oil from following the condensed water out of the chamber $d$ is to arrange a float valve $u$ as seen in Fig. 3. Such a valve is adapted to close the passage leading from the bottom of the chamber $d$ and is arranged so that it will float on water but sink in oil and consequently will fall with the water and close the passage when required. In this form the drain cock $s$ will be arranged below the float valve as shown.

Referring again to the apparatus shown in Fig. 1, as soon as the water has been drained off the cock $s$ is closed and the lubricant chamber is then refilled with lubricant and the plug replaced. By now opening the condenser valve $o$ and nozzle valve $x$ the apparatus is ready for working again.

To keep the column of oil in the sight tube $h$ steady and free from oscillation due to the pressure of air cushioning I provide any convenient means for insuring complete escape of the air when filling the device. For example a vent plug $v$ communicating with the valve box $g$ and sight tube $h$ as shown in Fig. 2 may be used. When filling the device the plug is partly screwed in and finally tightened when oil begins to issue from the small orifice $v^1$.

When the apparatus is used with superheated steam the lubricant may be fed into the steam pipe in flushes instead of drop by drop in order to minimize the vaporizing effect on the aqueous lubricant. To effect the feed in flushes in this way any convenient device may be used, but one form of apparatus is shown diagrammatically in Fig. 4. In this apparatus, which is placed between the pipe $n$ and the steam pipe $r$, a chamber $l$ is provided connected with the pipe $w$, which leads into the steam pipe, by means of two passages $y$ and $z$. In operation the chamber $l$ always has lubricant therein up to the level shown and as the drop by drop feed enters said chamber the level rises until the whole of the chamber and the right hand part of the passage $z$ are filled. By reason of the restricted nature of the passages $y$ and $z$ the last drop of lubricant will cause a sufficient rise in level to start a siphon action through the passage $z$ which causes the lubricant to be discharged from the chamber $l$ until the level shown in Fig. 4 is again reached. The passage $y$ permits steam to flow into the chamber $l$ during the discharge of lubricant. The action is then repeated.

It will be understood that the invention is not confined to the sight feed herein shown and described and may be arranged and modified in various ways without departing from the invention.

What I claim as my invention and desire to secure by Letters Patent is:—

1. A sight-feed for heavy lubricants, comprising in combination a sight-feed chamber, a liquid of low specific gravity in the chamber, an inlet at the upper portion of the chamber, and an outlet at the lower portion of the chamber.

2. A sight-feed for heavy lubricants, comprising in combination a sight-feed chamber, a liquid of low specific gravity in the chamber, an inlet at the upper portion of the chamber, an outlet at the lower portion of the chamber, means for injecting the lubricant into said chamber, and means retaining said liquid in said chamber while allowing the lubricant to pass through said outlet.

3. A sight-feed for heavy lubricants, comprising in combination a sight-feed chamber, a liquid of low specific gravity in the chamber, an inlet at the upper portion of the chamber, an outlet at the lower portion of the chamber, and an uptake communicating below with said outlet and normally filled with the lubricant.

4. A sight-feed for heavy lubricants, comprising in combination a sight-feed chamber, a liquid of low specific gravity in the chamber, an inlet at the upper portion of the chamber, an outlet at the lower portion of the chamber, an uptake communicating below with said outlet and normally filled with the lubricant, and means controlling the communication between said uptake and said outlet.

In testimony whereof I have signed my name to this specification in the presence of two subscribing witnesses.

ERNEST WALTER JOHNSTON.

Witnesses:
 WILLIAM REID SHARP,
 CLEMENT LEAN.

Copies of this patent may be obtained for five cents each, by addressing the "Commissioner of Patents, Washington, D. C."